United States Patent [19]

Mitchell

[11] Patent Number: 4,483,972

[45] Date of Patent: Nov. 20, 1984

[54] INTEGRATED CROSS-LINKERS AND AMINE FUNCTIONAL SILOXANE SCAVENGERS FOR RTV SILICONE RUBBER COMPOSITIONS

[75] Inventor: Tyrone D. Mitchell, Albany, N.Y.

[73] Assignee: General Electric Company, Waterford, N.Y.

[21] Appl. No.: 462,949

[22] Filed: Feb. 1, 1983

[51] Int. Cl.$^3$ .............................................. C08G 77/06
[52] U.S. Cl. ...................................... 528/18; 528/15; 528/17; 528/19; 528/21; 528/22; 528/33; 528/34; 528/901
[58] Field of Search ................... 528/15, 18, 19, 21, 528/33, 34, 901

[56] References Cited

U.S. PATENT DOCUMENTS

| | | | |
|---|---|---|---|
| 3,364,160 | 1/1968 | Golitz | 260/18 |
| 3,378,520 | 4/1968 | Sattlegger et al. | 260/46.5 |
| 3,471,434 | 10/1969 | Pande et al. | 260/37 |
| 3,549,590 | 11/1970 | Holdstock et al. | 260/46.5 |
| 3,560,492 | 2/1971 | Golitz et al. | 260/46.5 |
| 3,622,529 | 11/1971 | Evans | 260/18 S |
| 3,796,686 | 3/1974 | Golitz et al. | 260/46.5 G |
| 3,826,782 | 7/1974 | Lengnick | 260/46.5 E |
| 3,829,529 | 8/1974 | Lengnick | 260/827 |
| 3,839,386 | 10/1974 | Lengnick | 260/448.2 N |
| 3,933,729 | 1/1976 | Letoffe | 260/37 SB |
| 3,983,265 | 9/1976 | Letoffe | 427/58 |
| 4,180,642 | 12/1979 | Takago | 528/32 |
| 4,248,993 | 2/1981 | Takago | 528/38 |
| 4,267,297 | 5/1981 | Hanada et al. | 528/18 |
| 4,323,489 | 4/1982 | Beers | 528/18 |
| 4,339,563 | 7/1982 | Takago et al. | 528/15 |
| 4,376,192 | 3/1983 | Takago et al. | 528/33 |
| 4,387,177 | 6/1983 | Mine et al. | 528/18 |
| 4,388,433 | 6/1983 | Klein et al. | 528/18 |
| 4,395,443 | 7/1983 | Shimizu et al. | 528/18 |
| 4,395,526 | 7/1983 | White et al. | 528/34 |
| 4,417,042 | 11/1983 | Dziark | 528/901 |
| 4,424,157 | 1/1984 | Chung | 528/21 |

Primary Examiner—Herbert J. Lilling

[57] ABSTRACT

The present invention relates to an alkoxy-functional one-component RTV silicone rubber composition having therein novel scavenger compounds. The novel scavenger compounds comprise multi-amine functional silanes and amine functional siloxanes which can be either pure scavengers or integrated cross-linker, scavengers.

29 Claims, No Drawings

INTEGRATED CROSS-LINKERS AND AMINE FUNCTIONAL SILOXANE SCAVENGERS FOR RTV SILICONE RUBBER COMPOSITIONS

BACKGROUND OF THE INVENTION

The present invention relates to a one-component RTV silicone rubber composition, and more particularly, the present invention relates to an alkoxy-functional one-component RTV silicone rubber composition having therein amine-functional scavengers.

One-component room-temperature vulcanizable silicone rubber compositions are well known. Such compositions disclosed in BRUNER, U.S. Pat. No. 3,035,016 and CEYZERIAT, U.S. Pat. No. 3,133,891. These patents disclose acyloxy-functional one-component RTV (RTV in this application refers to room-temperature vulcanizable) silicone rubber compositions. By acyloxy-functional, it is meant that the cross-linking agent in the composition was an acyloxy-functional silane and more particularly, an acetoxy-functional silane such as methyltriacetoxy-silane. The composition is prepared by mixing in an anhydrous manner, a silanol-terminated diorganopolysiloxane polymer with the acyloxy-functional cross-linking agent and a metal condensation catalyst. The resulting mixture was then compounded with fillers and various other ingredients in a substantially anhydrous manner. When it was desired to cure the composition, the composition was exposed to atmospheric moisture wherein the acyloxy groups hydrolyzed to cross-link the polymer to form a silicone elastomer. Since the early times of the BRUNER, U.S. Pat. No. 3,035,016 composition there have been devised various other types of functional RTV compositions such as ketoxime-functional RTV compositions, amine-functional RTV compositions, alkoxy-functional RTV compositions and so forth. An example of an amine-functional one-component RTV silicone rubber composition is to be found, for instance, in NITZSCHE, et al, U.S. Pat. No. 3,032,528. This patent utilizes an amine-functional silane as a cross-linking agent and has the advantages that it is fast-curing and non-corrosive. Nevertheless, it does give off an objectionable odor upon curing and sometimes toxic by-products.

One of the most advantageous types of one-component RTV compositions was the alkoxy-functional RTV composition. An example of such a composition is to be found in BEERS, U.S. Pat. No. 4,100,129. Such a composition gives off an alcohol by-product upon curing and as a result is substantially non-corrosive. Further, it does not give off objectionable odors upon curing and has many other advantageous properties. However, one of the disadvantages of the BEERS, U.S. Pat. No. 4,100,129 composition was the fact that it was not as shelf-stable as would be desired. That is, after prolonged storage of 6 months or more, it was found that the cure rate of the composition would be unnecessarily retarded. Various means were devised to preserve the shelf-stability of such a composition. However, all such means were not as successful as would be desired and necessitated additional steps in the preparation of the composition which increased the cost thereof. Another disadvantage of the BEERS, U.S. Pat. No. 4,100,129 composition is it did not have as rapid a cure rate as would be desired. This was true even with the titanium chelate catalysts of the BEERS patent. Accordingly, it was highly desirable to develop an alkoxy-functional RTV composition; that is, a composition that would cure through the hydrolysis and cross-linking of alkoxy-groups in the base polymer and which composition would be shelf-stable and have a rapid cure rate. It is hypothesized and has been hypothesized that the reason the BEERS, U.S. Pat. No. 4,100,129 composition does not have a sufficiently rapid cure rate and is not shelf-stable, was the fact that even though the composition was prepared anhydrously or in a substantially anhydrous manner, there became incorporated in the composition various unbonded hydroxy groups. Such unbonded hydroxy groups entered the composition as a result of their presence in the base silanol-terminated diorganopolysiloxane polymer or in the filler or in the various ingredients that were added to the composition. It was postulated that as a result of the unbonded hydroxy groups in such compositions, such hydroxy groups hydrolyzed the alkoxy groups to convert them to hydroxy groups. As a result, when the composition was exposed to atmospheric moisture it would cure slowly sometimes and other times it might not even cure at all; as a result of the converted hydroxy groups not being able to react and cross-link with each other. It has been postulated that the longer the polymer was packaged and maintained prior to exposure to atmospheric moisture for the purpose of curing it, the more alkoxy-groups would be hydrolyzed by the unbonded hydroxy groups and the more the shelf-stability and the cure rate of the composition would degrade. A recent development in rectifying this phenomenon is to be found in the disclosure of WHITE, et al, Ser. No. 277,524, filed on June 16, 1981, now U.S. Pat. No. 4,395,526 which discloses the use of scavengers and integrated cross-linker, scavengers for the purpose of reacting with unbonded hydroxy groups in the uncured RTV composition so as to preserve the shelf-stability and the cure rate of the RTV composition. Thus, it is disclosed in the foregoing WHITE, et al case, that there can be utilized in the composition a compound having a scavenging leaving group which is capable of readily and rapidly reacting with all unbonded hydroxy groups in the composition so as to render them useless or inactive for reacting with the alkoxy-groups in the base diorganopolysiloxane polymer. It is indicated in the WHITE, et al, case that such scavenging leaving groups can be either a pure scavenging compound or they can be present an integrated cross-linker, scavenger; that is, an integrated cross-linker, scavenger being one which has scavenging groups in it and also has alkoxy groups in it. Such a compound can react with the base silanol-terminated polymer to result in a polymer system or base polymer system having scavenging groups as well as having alkoxy-groups on the terminal silicon atoms of the base diorganopolysiloxane polymer. Accordingly, such end-cappers or integrated cross-linker, scavengers could be utilized to both end-cap the silanol-terminated polymer so as to produce a base polymer capable of cross-linking to form an RTV silicone rubber composition and also could be utilized to react with unbonded hydroxy groups in the composition so as to prevent such unbonded hydroxy groups from attacking and hydrolyzing the alkoxy groups in the system. It is indicated in the WHITE, et al, case that the scavenging leaving group can be an amine-functional group, both in the pure scavenger or in the integrated cross-linker, scavenger compound. Examples of such amine-functional scavengers and integrated cross-linker scavengers are given on page 21 of WHITE, et al, U.S. Pat. No.

4,395,526; such as, for instance, methyldimethoxymethylaminosilane, etc. It is disclosed in that patent, basically, that the integrated cross-linker, scavenger or pure scavenging compound has in the amine-functional group a single amine functionality, which can be utilized for the purposes of the WHITE, et al case. It has now been found unexpectedly that compounds having additional amine functionalities, siloxane amine compounds, can be utilized as scavenging compounds and as integrated cross-linker, scavengers. Such compounds react with unbonded hydroxy groups in the composition so as to preserve the shelf-stability and the cure rate of the alkoxy-functional RTV silicone rubber compositions. Such amine-functional compounds as disclosed by the instant case can be used as both pure scavengers or as integrated cross-linker, scavengers for the purpose of end-capping silanol terminated polymers to form the base polymer of an alkoxy-functional one-component RTV system having a rapid cure rate and good shelf-stability.

It is one object of the present invention to provide for an alkoxy-functional RTV composition having good shelf-stability in which there is present an amine-functional scavenging compound.

It is an additional object of the present invention to provide an alkoxy-functional one-component RTV silicone rubber composition having a rapid cure rate in which there is present a scavenging compound having an amine functionality for reacting with unbonded hydroxy groups.

It is yet an additional object of the present invention to provide for scavenging compounds and integrated cross-linker, scavenging compounds for reacting and bonding with unbonded hydroxy groups in alkoxy-functional one-component RTV compositions in which in each hydrolyzable leaving group in the scavenging compound, there is more than one amine functionality.

It is yet still an additional object of the present invention to provide a process for producing a shelf-stable, rapid-cure-rate one-component alkoxy-functional RTV composition in which there is present a scavenging compound or integrated cross-linker, scavenger compound having as a scavenging group an amine-functional group with more than one amine functionality in each such leaving group. These and other objects accomplished by means of the disclosure set forth herein below.

SUMMARY OF THE INVENTION

In accordance with the objects there is provided by the present invention a shelf-stable, fast-curing one-component RTV silicone rubber composition comprising, (A) an organopolysiloxane base polymer having a viscosity varying in the range of 100 to 1,000,000 centipoise at 25° C. where the organo group is a monovalent hydrocarbon radical wherein in said base polymer the terminal silicon atoms in the polymer chain have bonded to them at lease one alkoxy group;

(B) an effective amount of a condensation catalyst; and (C) an effective amount of a scavenging compound selected from the class consisting of (i) scavenging silanes of the formula,

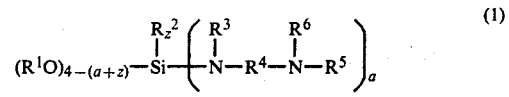

wherein $R^1$, $R^2$ are individually selected from $C_{1-13}$ monovalent hydrocarbon radicals, $R^5$ and $R^6$ are individually selected from the class consisting of hydrogen and $C_{1-8}$ monovalent hydrocarbon radicals, $R^4$ is a $C_{2-8}$ divalent hydrocarbon radical; z is a whole number, 0 or 1; a is a whole number that can vary from 1 to 4; and the sum of $a+z$ can vary from 1 to 4; and $R^3$ is selected from the class consisting of hydrogen, $C_{1-8}$ monovalent hydrocarbon radicals, and a radical of the formula,

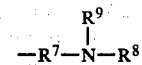

wherein $R^8$, $R^9$ are individually selected from the class consisting of hydrogen and $C_{1-8}$ monovalent hydrocarbon radivals and $R^7$ is a $C_{2-8}$ divalent hydrocarbon radical; and (ii) scavenger siloxanes of the formula,

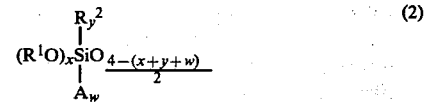

where $R^1$, $R^2$ are as previously defined and A is a radical selected from the class consisting of simple amine radicals of the formula,

where $R^{10}$, $R^{11}$ are individually selected from hydrogen, $C_{1-8}$ monovalent hydrocarbon radicals and multi-amine functional radicals of the formula,

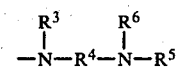

where $R^3$, $R^5$, $R^6$ and $R^4$ are as previously defined; x varies in the range of 0.00 to 2.50; y varies in the range of 0.00 to 2.50; w varies in the range of 0.05 to 1.5; and the sum of $x+y+w$ varies in the range of 2.10 to 3.00.

It should be noted that for the simple amine-functional groups such as the ones disclosed in WHITE, et al, U.S. Pat. No. 4,395,526 and in the instant case, the by-product given off for most of those leaving groups is a gas. Accordingly, such simple amine-functional scavenging compounds and integrated cross-linkers are highly desirable in the production of the alkoxy-functional one-component RTV systems of the WHITE, et al, case. Since, if the by-product of such scavenging leaving groups is a gas, then the gas can be easily removed when the compound reacts with unbonded hydroxy groups in the composition to bind them and render them inert to the alkoxy groups. Accordingly, it is desirable that the by-product of the scavenging leaving group be the gas or liquid at room temperature so that the by-product can be removed easily in the production of the RTV composition and particularly in the continuous production of the RTV composition as disclosed in CHUNG, et al, Ser. No. 427,895.

The foregoing CHUNG, et al, Ser. No. 437,895, discloses the production of the WHITE, et al compositions in a substantially continuous manner in a devolatilizing extruder.

The silanes of Formulas (1) and (2) can be either pure scavenging compounds or integrated cross-linkers. Preferably the siloxanes of Formula (2) are just integrated cross-linker, scavengers.

It is desirable in many cases to remove the by-products since they may affect the desired properties of the cured RTV silicone rubber composition. Thus, a scavenging, leaving group by-product may affect the adhesion properties or the ultimate shelf-stability. However, it should be noted if such scavenging, leaving group by-products, whether gas, liquid or solid, do not affect the physical properties of the cured and uncured RTV silicone rubber composition or if they do affect such properties and it is not of importance to the desired end-use of the composition, then the particular amine-functional scavenger can be used to produce the composition. It is the purpose of the instant application to disclose scavengers and integrated cross-linker scavenging compounds having amine scavenging leaving groups whose by-products are gases, liquids or solids and which can be used in the compositions of WHITE, et al, U.S. Pat. No. 4,395,526 and particularly when such compositions are produced in a devolatilizing extruder as disclosed in CHUNG, et al, Ser. No. 437,895. Thus, if the desired end-properties are affected by the by-product of the scavenging leaving group, then it may be desirable to use one of the amine-scavenging compounds which gives off a gas or liquid by-product, which gas or liquid by-products can be easily removed in a devolatilizing extruder. On the other hand, if the by-product of the scavenging leaving group does affect certain physical properties of the uncured and cured composition and such is not of importance to the use of the RTV silicone rubber composition, then any of the scavenging compounds or integrated cross-linker scavenging compounds of the instant case can be utilized to react with unbonded hydroxy groups in the composition. This is true of whether the by-product of the scavenging group is a liquid or a solid and irrespective of whether the composition is prepared continuously in a devolatilizing extruder or by some other means.

DESCRIPTION OF THE PREFERRED EMBODIMENT

In the compounds of Formulas (1) and (2), $R^1$ and $R^2$ are each individually selected from $C_{1-13}$ monovalent hydrocarbon radicals. Thus, $R^1$ and $R^2$ can be selected from alkyl radicals of 1 to 8 carbon atoms such as methyl, ehtyl, propyl, etc.; cycloalkyl radicals such as cyclohexyl, cycloheptyl, etc.; mononuclear radicals such as phenyl, methylphenyl, ethylphenyl, etc.; alkenyl radicals such as vinyl, allyl, etc.; and halogen substituted monovalent hydrocarbon radicals such as 3,3,3,-trifluoropropyl. In addition, $R^1$ and $R^2$ can be selected from monovalent ketone radicals such as pent-4-onyl radicals, monovalent ester radicals such as acetoxy ethyl-radicals; and monovalent ether radicals such as methoxy ethyl-, methoxy ethoxyethyl, and so forth.

Before proceeding to a definition of the other radicals in the compound of Formula (1), it is necessary to say something about the difference between the compounds of Formula (1) and the compounds of Formula (2). The compounds of Formula (1) are silane scavenging compounds. The compounds of Formula (2) are siloxane scavenging compounds. It is also necessary to point out that the scavenging leaving group in the compounds and silanes of Formula (1) is of a more limiting nature than the amino-scavenging leaving group of the compounds of Formula (2).

Now proceeding to the definition of the other radicals, $R^5$ and $R^6$ are all individually selected from hydrogen and $C_{1-8}$ monovalent hydrocarbon radicals. The $R^3$ group can be selected from the same groups as $R^5$ and $R^6$, and in addition, a radical of the formula,

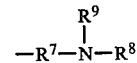

$$-R^7-\underset{\underset{R^8}{|}}{N}-R^9$$

where $R^8$ and $R^9$ are individually selected from the class consisting of hydrogen and $C_{1-8}$ monovalent hydrocarbon radicals and $R^7$ is defined as indicated below. Examples of the radicals, that the $R^8$, $R^9$, $R^5$, $R^6$ and $R^3$ groups can be selected from are, for instance, hydrogen, and all $C_{1-8}$ monovalent hydrocarbon radicals such as, alkyl radicals, for instance, methyl, ethyl, propyl, etc.; alkenyl of 2 to 8 carbon atoms such as vinyl, allyl, etc.; cycloalkyl radicals such as cyclohexyl, cycloheptyl, etc.; mononuclear radicals such as phenyl, phenylethyl, etc.; and halogen substituted monovalent hydrocarbon radicals of 1 to 8 carbon atoms, such as 3,3,3-trifluoropropyl. In addition, any of those radicals can be selected from ether hydrocarbon radicals, such as methoxyethyl, etc. The $R^4$ and the $R^7$ radicals are, on the other hand, selected from divalent hydrocarbon radicals of 2 to 8 carbon atoms and halogen substituted divalent hydrocarbon radicals of 2 to 8 carbon atoms including ether radicals; examples of such radicals are, for instance, alkylene radicals of 2 to 8 carbon atoms; cycloalkylene radicals of 2 to 8 carbon atoms; arylene radicals of 2 to 8 carbon atoms, such as for instance, phenylene; and divalent ether radicals of 2 to 8 carbon atoms such as, for instance, ethylene, oxyethylene, etc.

In the compounds of Formula (2) the radicals $R^1$, $R^2$, $R^3$, $R^5$, $R^6$, $R^4$, $R^7$, $R^8$, $R^9$ are defined in the same manner. That is, the radicals in the groups represented by A have the same definition as given above for these radicals in the compounds of Formula (1). As stated in the above compounds of Formula (2), the $R^1$ and $R^2$ groups are defined the same as the same groups in the compounds of Formula (1). It should be noted that for the compounds of Formula (2), that the formula is an average unit formula and represents the different groups on an average SiO unit in the siloxane chain. Such compounds of Formula (2) may vary from disiloxanes to polysiloxanes of up to 20 silicone atoms. The basic difference between the compounds of Formula (1) and Formula (2) is that the compounds of Formula (2) are siloxanes, that is, they have a backbone or polymer chain of silicone and oxygen atoms and are polymers while the compounds of Formula (1) are monomers of silicon atoms and are referred to as silanes. Further, the amines of the A group in the compounds of Formula (2) are more broadly defined than the monomers of Formula (1); that is, the amine-functionality in the compounds of Formula (2) is broader and encompasses more types of amine functionality than the amine functionality of the compounds of Formula (1). The amine functionality of the A group in the compounds of Formula (2) encompasses an amine functionality where there is a single nitrogen atom as well as the case where there are 2 nitrogen atoms in the amine functionality similar to that of the silanes of the compounds of Formula (1).

The compounds of Formula (2) can be used as integrated cross-linking agents within the scope of the instant case in the formations of the RTV compositions of the instant case.

The reaction by-products formed from the compounds of Formula (2) may be gaseous, liquid, or solid, depending on the A group functionality; while the reaction by-products of the compounds of Formula (1) when they react with unbonded hydroxy groups in the composition may be liquids or solids. In this respect the scavenging and integrated cross-linking compounds of Formula (2) are more versatile than the scavenging and integrated cross-linker scavenging compounds of Formula (1). In the foregoing formulas given above and particularly, Formula (1), z is a whole number of 0 to 1; a is a whole number that varies from 1 to 4; and the sum of a+z can vary from 1 to 4. Accordingly, in order for the compound of Formula (1) to be an integrated cross-linker, scavenger, it has to have at least one alkoxy group and preferably two such groups. If it has less than one or two alkoxy groups, it will be solely a scavenging compound. If it has one, two or more alkoxy groups, then it will be an integrated cross-linker, scavenger; that is, a compound that can end-cap a silanol end-stopped base polymer as was explained above to produce a base alkoxy-terminated diorganopolysiloxane compound.

In the compounds of Formula (2), the values of x, y and w are given so that the compound is an integrated cross-linker, scavenger compound or pure scavenging compound.

Further, with respect to the compounds of Formula (2) and (7) they have to have at least one alkoxy group in the polymers and preferably two, as well as preferably one A group. Further, while A groups as well as alkoxy groups can be tolerated in the polymer chain, they should not be present to too great an extent since too extensive cross-linking will take place. Although this is not as important in the case of disiloxanes and trisiloxanes, it becomes more important with the higher molecular weight siloxanes of the compounds of Formula (2).

Accordingly, the compounds of Formula (1) and (2) for which the above definitions have been given, can be scavenging compounds, that is, pure scavenging compounds, or can be integrated cross-linker, scavenging compounds which can function as end-cappers or as pure scavenging compounds depending on the way they are used and the quantities that are used. As set forth in LUCAS, Ser. No. 449,105, the composition can function as an all alkoxy one-component RTV composition with the desired properties if it has up to 50% by weight of diorganopolysiloxane polymer in it terminated solely by one alkoxy group. The remaining base polymer has to be terminated by at least two alkoxy groups on each end of the polymer chain. Preferably the total base polymer is terminated by at least two alkoxy groups on the terminal silicon atom of the polymer chain. Further, preferably the diorganopolysiloxane polymers can be blends of diorganopolysiloxane polymers having a viscosity in the ranges indicated above, that is, of 100 to 1,000,000 centipoise at 25° C. More will be said about the makeup of the base polymer other than the terminal groups when reference is made to the silanol terminated diorganopolysiloxane polymer from which it is formed as will be explained below.

Proceeding now to the preparation of the composition; in addition to the alkoxy-terminated base polymer and the scavenging compound for absorbing or reacting with free hydroxy groups or unbonded hydroxy groups, the composition has to have a condensation catalyst in order for the composition to cure as an RTV composition.

Effective amounts of the condensation catalysts which can be used in the practice of the present invention to facilitate the cure of the RTV compositions are, for example, 0.001 to 1 part based on the weight of 100 parts of the silanol-terminated polydiorganosiloxane of Formula (8). These are included tin compounds, for example, dibutyltindilaurate; dibutyltindiacetate; dibutyltindimethoxide; carbomethoxyphenyl tin tris-uberate; tin octoate; isobutyl tin triceroate; dimethyl tin dibutyrate; dimethyl tin dineodeconoate; triethyl tin tartrate; dibutyl tin dibenzoate; tin oleate; tin naphthenate; butyltintri-2-ethylhexoate; tinbutyrate. The preferred condensation catalysts are tin compounds; and dibutyltindiacetate is particularly preferred.

Titanium compounds which can be used are, for example, 1,3-propanedioxytitanium bis(ethylacetoacetate); 1,3-propanedioxytitanium bis(acetylacetonate); diisopropoxytitanium bis(acetylacetonate); titanium naphthenate; tetrabutyltitanate; tetra-2-ethylhexyltitanate; tetraphenyltitanate; tetraoctadecyltitanate; ethyltriethanolaminetitanate. In addition beta-dicarbonyl-titanium compounds as shown by WEYENBERG, U.S. Pat. No. 3,334,067 can be used as condensation catalysts in the present invention.

Zirconium compounds, for example, zirconium octoate, also can be used.

Further examples of metal condensation catalysts are, for example, lead 2-ethyloctoate; iron 2-ethylhexoate; cobalt 2-ethylhexoate; manganese 2-ethylhexoate; zinc 2-ethylhexoate; antimony octoate; bismuth naphthenate; zinc naphthenate; zinc stearate;.

Examples of nonmetal condensation catalysts are hexylammonium acetate and benzyltrimethylammonium acetate.

Various fillers and pigments can be incorporated in the silanol or alkoxy-terminated organopolysiloxane, such as for example, titanium dioxide, zirconium silicate, silica aerogel, iron oxide, diatomaceous earth, fumed silica, carbon black, precipitated silica. glass fibers, polyvinyl chloride, ground quartz, calcium carbonate etc. The amounts of filler used can obviously be varied within wide limits in accordance with the intended use. For example, in some sealant applications, the curable compositions of the present invention can be used free of filler. In other applications, such as the employment of the curable compositions for making binding material on a weight basis, as much as 700 parts or more of filler, per 100 parts of organopolysiloxane can be employed. In such applications, the filler can consist of a major amount of extending materials, such as ground quartz, polyvinylchloride, or mixtures thereof, preferably having an average particle size in the range of from about 1 to 10 microns.

The compositions of the present invention also can be employed as construction sealants and caulking compounds. The exact amount of filler, therefore, will depend upon such factors as the application for which the organopolysiloxane composition is intended, the type of filler utilized (that is, the density of the filler and its particle size). Preferably, a proportion of about 10 to 300 parts of filler which can include up to about 35 parts of a reinforcing filler, such as fumed silica filler, per 100 parts of silanol-terminated organopolysiloxane is utilized.

In addition to the filler, other various ingredients can be added to the composition, such as adhesion promoters, plasticizers of one type or another, heat age additives and sag control additives as disclosed in the patent application of BEERS, Ser. No. 349,537, and as disclosed in LUCAS, Ser. No. 349,538. All the patents and patent applications in the present case are incorporated by reference. In addition, the point that has been made above is that a metal condensation catalyst has to be present in the composition in order for the alkoxy-terminated diorganopolysiloxane polymer to cure in a manner that is well-known or identified with a silicone elastomer. If a metal condensation catalyst is not present, then the composition will cure very slowly, and will most probably have the consistency of a cheesy mass. In addition to the condensation catalyst, there may be further present in the composition an affective amount of cross-linking silane of the formula,

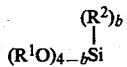
(3)

where $R^1$ and $R^2$ are individually selected from $C_{1-13}$ monovalent hydrocarbon radicals as identified previously and b is a whole number equal to 0 or 1.

A mechanistic study of the RTV of the present invention supports the theory that the use of the scavenging silane of Formula (1) or (2) below or in combinations thereof with the cross-linking silane of Formula (3), in accordance with the practice of the invention, minimize the likelihood that detrimental amounts of $R^1OH$ will be generated during the shelf storage period. Preferably there is utilized from 0.5 to 10 parts by weight of the excess cross-linking agent silane of Formula (3) per 100 parts by weight of the base alkoxy-terminated diorganopolysiloxane polymer.

In addition to the cross-linking silane there is preferably present an effective amount of a cure accelerator selected from a group consisting of substituted guanidines, amines and mixtures thereof. Among the curing accelerators which can be used in the practice of the invention are silyl substituted guanidines having the formula, $(Z)_gSi(OR^1)_{4-g}$, (4)

where $R^1$ is as previously defined, Z is a guanidine radical of the formula,

$R^{22}$ is divalent $C_{2-8}$ alkylene radical, $R^{20}$ and $R^{21}$ are selected from hydrogen and $C_{1-8}$ alkyl radicals and g is an integer equal to 1 to 3 inclusive. In addition, alkyl substituted guanidines having the formula,

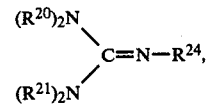

where $R^{20}$ and $R^{21}$ are as previously defined and $R^{24}$ is a $C_{1-8}$ alkyl radical, also can be employed. Some of the silyl substituted guanidines included with Formula (4) are shown by Takago, U.S. Pat. Nos. 4,180,642 and 4,248,993.

Preferably there is utilized from 0.1 to 10 parts of the cure accelerator per 100 parts of the base alkoxy-terminated diorganopolysiloxane polymer. For more information as to such cure accelerators in compositions of the instant case, one is referred to the disclosure of WHITE, et al, U.S. Pat. No. 4,395,526.

In addition to the foregoing base alkoxy-terminated diorganopolysiloxane polymer and the scavenging compounds of Formula (1) and (2) there may be present a polyalkoxy-terminated diorganopolysiloxane polymer of the formula,

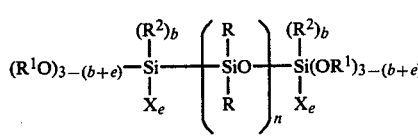
(5)

where R, $R^1$ and $R^2$ are individually selected from $C_{1-13}$ monovalent hydrocarbon radicals as defined previously, e is a whole number which is equal to 0 or 1, inclusive, b is a whole number which is equal to 0 or 1, inclusive, and the sum of b+e is equal to 0 or 1, inclusive, n is an integer having a value of from 50 to 2500 inclusive, and X is a hydrolyzable leaving group selected from the group consisting of amido, cyclic amido, amino, carbamato, enoxy, imidato, isocyanato, oximato, thioisocyanato and ureido radicals. Further, X can be the same as A in Formula (2).

It should be noted that the cure accelerator is preferably selected from di-n-hexylamine and di-n-butylamine, and that the condensation catalyst is preferably selected from dibutyltindiacetate and dibutyltindilaurate.

The compound of Formula (5) is a polymer that is produced by reacting a silanol-terminated diorganopolysiloxane polymer with generally the integrated cross-linker, scavenging compounds of WHITE, et al, U.S. Pat. NO. 4,395,526, or more preferably, by reacting the silanol-terminated diorganopolysiloxane polymer with an integrated cross-linker, scavenging compound of Formula (1) or Formula (2) in which the integrated cross-linker, scavenger has at least two alkoxy groups on the terminal silicone atoms. Although the compounds of Formula (5) need not be present in the composition, they may be present in varying quantities and will not detract from the end properties of the desired composition. It is disclosed in the compounds of Formula (5) that X can be all of the foregoing hydrolyzable leaving groups since that does not detract from the properties of the composition. Preferably, X is an amino-functional hydrolyzable leaving group in accordance with the instant invention or an amino hydrolyzable leaving group in accordance with the invention of WHITE, et al, U.S. Pat. No. 4,395,526.

In the preferred embodiment of the instant invention, it is preferred that R, $R^1$ and $R^2$ be methyl; $R^6$ and $R^3$ be hydrogen; and $R^5$ be methyl. It is also preferred that the tin condensation catalyst be selected from dibutyltindiacetate and dibutyltindilaurate. In the instant invention a cure accelerator is not strictly necessary because the amine functionality of the scavenger compound acts as an accelerator. The compounds of Formula (1) and (2) are both scavenging compounds and within the scope of the formulas can be both pure scavenging compounds and integrated crosslinker, scavenging compounds. In a more preferred embodiment of the instant invention there is disclosed a shelf-stable, fast-curing one-component RTV composition comprising a silanol-terminated diorganopolysiloxane polymer having a viscosity in the range of 100 to 1,000,000 centipoise at 25° C. where the organo group is a monovalent hydrocarbon radical and preferably a $C_{1-13}$ monovalent hydrocarbon radical and an integrated cross-linker, scavenger selected from (i) silanes of the formula,

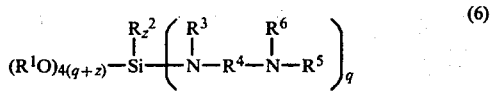

and (ii) a preferred integrated cross-linker, siloxane compound of the formula,

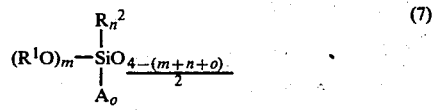

where $R^1$ and $R^2$ are individually selected from $C_{1-13}$ monovalent hydrocarbon radicals; $R^5$ and $R^6$ are individually selected from the class consisting of hydrogen and $C_{1-8}$ monovalent hydrocarbon radicals; $R^4$ is a $C_{2-8}$ divalent hydrocarbon radical; and $R^3$ is selected from the class consisting of hydrogen, $C_{1-8}$ monovalent hydrocarbon radicals and a radical of the formula,

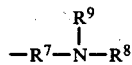

wherein $R^8$ and $R^9$ are independently selected from the class consisting of hydrogen and $C_{1-8}$ monovalent hydrocarbon radicals and $R^7$ is a $C_{2-8}$ divalent hydrocarbon radical. In the above Formulas (6) and (7), $R^1$, $R^2$, $R^5$, $R^6$, $R^4$, $R^3$, $R^7$, $R^8$, and $R^9$ all have the same definitions as given previously for the compounds of Formula (1) and (2). The only difference from the compounds of Formula (1) is that z is a whole number equal to 0 or 1; q is a whole number equal to 1, 2 or 3; and the sum of q+z can vary from 1 to 3. That is, in the compounds of Formula (6) there must always be one alkoxy group and preferably two or more alkoxy groups if the compound is to function as an integrated cross-linker, scavenger. With respect to the compounds of Formula (7), $R^1$, $R^2$ and A have the same definitions as given previously for the compounds of Formula (2). The only difference in the definition of the compounds of Formula (7) is that m varies from 0.15 to 2.50; n varies in the range from 0.1 to 1.9; and o varies in the range from 0.05 to 2.00 and the sum of m, n and o varies in the range of 2.10 to 3.00. In the compounds of Formulas (2) and (7) there must be present at least one alkoxy group on the silicon atoms in the polymer and preferably one alkoxy group on the terminal silicon atoms.

Further, in an all alkoxy system, the base polymers do not have any hydrolyzable leaving group other than alkoxy; for such systems there can be present a polymer species in which 50% by weight of the polymer species are polymers with only a single alkoxy-group on the terminal silicon atom, and the other 50% of the polymer species are diorganopolysiloxane base polymers with at least two alkoxy groups on the terminal silicon atom. However, for polymer systems having polymers such as that of Formula (5) where there is at least one hydrolyzable leaving group such as an amine functional group on the terminal silicon atoms and there is one or more alkoxy groups on the terminal silicon atoms, then the total base polymer system can be made up of such a polymer. There does not have to be mixed in such a base polymer system another base polymer having at least two alkoxy groups in the terminal silicon atom of the polymer chain.

Further, there will not be attempted to be shown all the polymers that can arise from the situation when the integrated cross-linker, scavenger is a compound of Formula (7). It can be envisioned that various branch chains can be formed on the terminal silicon atom when the integrated cross-linker is a compound of Formula (7). Only the formulas of the preferred polymer systems formed from the compounds of integrated cross-linker, scavengers of Formula (6) and (7) will be shown below. Again, in such a composition, along with the silanol polymer and integrated cross-linker, scavenger there has to be present a condensation catalyst or the composition will not cure to a silicone elastomer or to the consistency and physical properties associated with silicone elastomers.

The silanol-terminated diorganopolysiloxane polymer preferably has the formula,

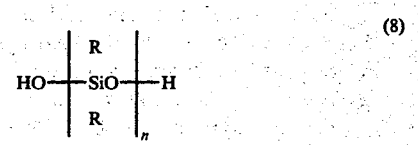

where R is individually selected from $C_{1-13}$ monovalent hydrocarbon radicals and n is a whole number that varies from 50 to 2500 and more preferably varies from 500 to 2000. Preferably the polymer has a viscosity that varies from 100 to 1,000,000 centipoise at 25° C. and more preferably varies from 1,000 to 250,000 centipoise at 25° C. The definition of the R radical in Formula (8) is the same as given for the group R in Formula (5) and (9) and can be the same as given previously for $R^1$ and $R^2$ in the foregoing definitions. Preferably, R is individually selected from methyl or a mixture of a major amount of methyl and a minor amount of phenyl, cyanoethyl, trifluoropropyl, vinyl and mixtures thereof. The silanol-terminated polymer of Formula (8) may have silanol groups in the polymer chain which can be converted to alkoxy groups or siloxy groups having hydrolyzable leaving groups thereon when the silanol diorganopolysiloxane polymer of Formula (8) is reacted with the integrated cross-linker, scavenger of Formulas (6) and (7). Too many of such groups are undesirable, since they cause undue cross-linking and undesirable properties in the final products. Preferably, the silanol-terminated diorganopolysiloxane polymer of Formula (8) has as few silanol groups in the polymer chain as possible so that there will not be undue cross-linking in the polymer chain. Further, the silanol-terminated diorganopolysiloxane can be a polymer specie of a single viscosity or it can be a blend of various polymer species of different viscosities. It is only necessary that the blend of viscosity of the polymer have a viscosity in the ranges indicated above. Utilizing the integrated cross-linker, scavengers of Formulas (6) and (7) which are reacted with a silanol-terminated polymer of Formula (8) there can be produced an alkoxy-terminated polymer that has the formula,

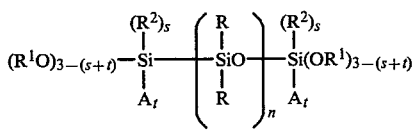
(9)

where R, $R^1$, $R^2$, $R^5$, $R^6$, $R^4$, $R^7$, $R^8$, $R^9$ are as defined previously; s is a whole number that is 0 or 1; t is a whole number that is is equal to 1 or 2 and the sum of s+t is equal to 1 to 2 and A is defined as given for Formulas (2) and (7). The compounds of Formula (9) are the preferred polymers that are formed by the reaction of the compounds of Formula (8) and the integrated cross-linker, scavengers of Formulas (6) and (7). No end-coupling catalyst is needed for such a reaction since the amine groups in the integrated cross-linker, scavengers of Formulas (6) and (7) function as catalysts to rapidly end-cap the silanol-terminated diorganopolysiloxane polymer of Formula (8).

Again there may be utilized excess amounts of cross-linking silane of Formula (3) in the same amounts as given previously with such a polymer as well as the same condensation catalysts as mentioned previously. Also, there may be used the same cure accelerators discussed previously with the previous embodiment. There may also be present the same additives, same fillers, adhesion promoters and other additives in the same quantities as discussed previously and as disclosed in WHITE, et al, U.S. Pat. No. 4,395,526. As noted previously, the compounds of Formula (9) are the preferred compounds that are formed or alkoxy-terminated polymers that are formed when the integrated cross-linker, scavengers of Formula (6) and (7) are reacted with a silanol-terminated diorganopolysiloxane polymer. There will not be attempted to be shown in this application all the different and various types of polymers, that is, alkoxy-terminated polymers, that can be prepared or formed by the reaction of such compounds.

The compounds or polymer species of Formula (9) are the polymer species that are present in major amounts when the integrated scavengers, cross-linkers of Formula (6) and (7) are are reacted with a silanol-terminated diorganopolysiloxane polymer of Formula (8). In the reaction mixture, all polymer species will not be of Formula (9). There will be some polymer species which will cross-link with each other and have slightly different configurations than that of FIG. (9). However, the majority of the polymer species in the polymer mixture if prepared in a substantially anhydrous manner will be the alkoxy-terminated polymers of Formula (9). These polymer species whether having just one alkoxy-group on the terminal silicon atoms or having more than one alkoxy group on the terminal silicon atoms can be utilized as 100% of such in the base polymer material.

With the polymer of Formula (9) there may be mixed in any proportions the polymers of Formula (5) as well as any of the other ingredients necessary or desirable or common with such alkoxy-functional one-component RTV compositions as disclosed in the foregoing patents and patent applications. The polyalkoxyterminated polymers of Formula (5) can be mixed in any proportions with the polymers of Formula (9) irrespective of whether the polymers of Formula (9) have just one or more alkoxy groups in the terminal silicon atom, since both will cure to a silicone elastomer with the traditional properties of silicone elastomer along with a condensation catalyst. Examples of these scavenging silanes and siloxanes of Formulas (1) and (2) are as follows:

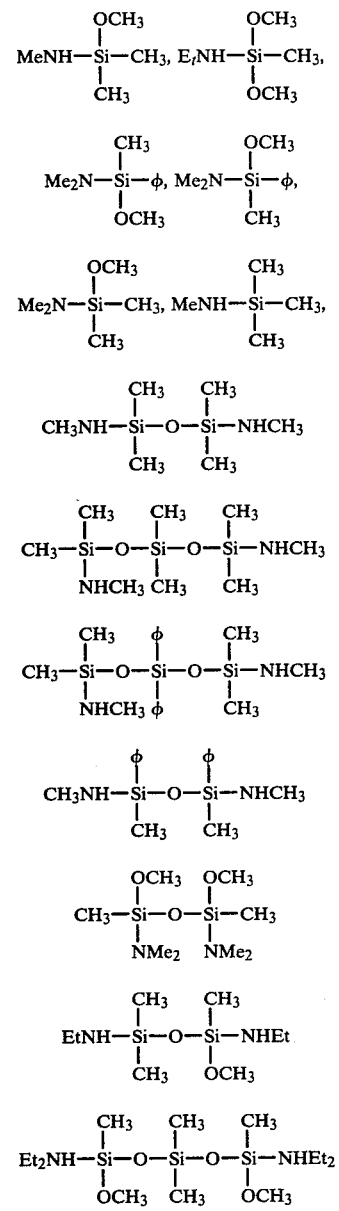

In the formulas above and below, Me is methyl, Et is ethyl and $\phi$ is phenyl. Examples of integrated cross-linker, scavenging comounds which come within the scope of compounds of Formulas (6) and (7) and, of course, (1) and (2) are as follows:

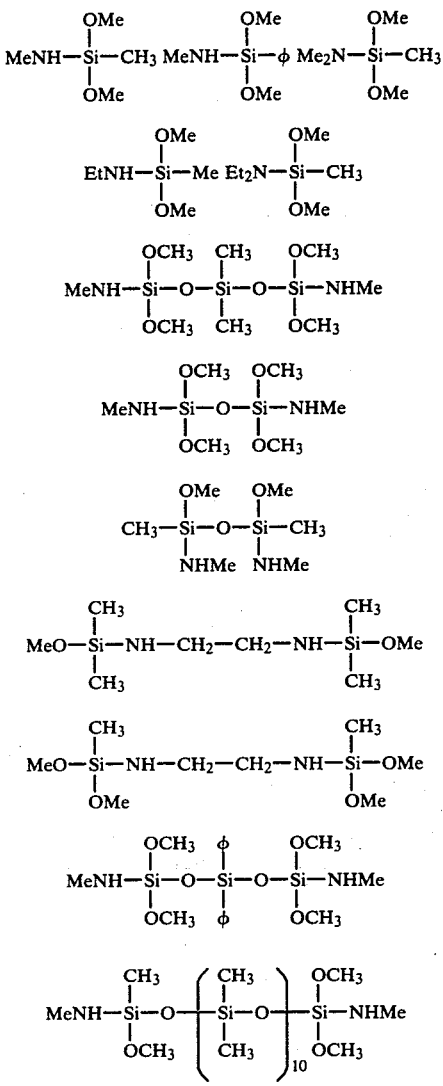

The composition is prepared by simply first producing the end-capped polymer either by reacting the polyalkoxy, cross-linking agent with a silanol-terminated diorganopolysiloxane polymer of Formula (8) with an end-capping catalyst, and then adding to it the scavenging compound and the other ingredients as necessary. Where an integrated cross-linker, scavenger compound of the instant case is utilized, then the integrated cross-linker, scavenging compound is added to the silanol-terminated polymer without a catalyst so as to produce the end-capped polymer. Then the other ingredients are added as desired. This can be done continuously or semicontinuously in a devolatilizing extruder as disclosed in CHUNG, Ser. No. 437,895. It must be, of course, obvious that the foregoing mixing is carried out in an anhydrous manner and that the RTV composition is prepared and stored in a substantially anhydrous manner if it is desired to preserve the curing properties of the composition. When it is desired to cure the composition, it is exposed to atmospheric moisture whereupon it will fully cure to a silicone elastomer with full cure taking place in 24 hours. In any case, it is necessary to form the alkoxy-terminated polymer first before the other ingredients are added, and preferably adding the scavenging compound to the composition before the other ingredients. When an integrated cross-linker, scavenging compound is utilized, such as that of Formula (2), (6) and (7) then it is not necessary to add an end-coupling catalyst since these amine functional compounds function themselves as catalysts. The reaction is auto-catalytic. With respect to the amount of scavenging silane that is utilized when an integrated cross-linker, scavenger compound is utilized, it is, of course, necessary that there be utilized excess scavenging compound or integrated cross-linker, scavenging compound to bond with the unbonded hydroxy groups in the composition. Generally from 0.5 to 10 parts by weight of the scavenging compound is utilized when it is utilized as a scavenger for unbonded hydroxy groups in the composition per 100 parts of the base alkoxy-terminated diorganopolysiloxane polymer or per 100 parts of the base silanol-terminated diorganopolysiloxane polymer base polymer. The composition is substantially acid free.

The expression "substantially acid-free" with respect to defining the elastomer made from the RTV composition of the present invention upon exposure to atmospheric moisture means yielding byproducts having a pKa of 5.5 or greater with 6 or greater preferred and 10 or greater being particularly preferred.

Minor amounts of amines, substituted guanidines, or mixtures thereof, can be utilized as curing accelerators in the polyalkoxy compositions of the present invention. There can be used from 0.1 to 5 parts, and preferably about 0.3 to 1 part of curing accelerator, per 100 parts of the silanol-terminated polymer of Formula (9) to substantially reduce the tack-free time (TFT) of the RTV composition of the present invention. This enhanced cure rate is maintained after it has been aged for an extended shelf period, for example 6 months or more at ambient temperatures, or a comparable period under accelerated aging conditions. Its cure properties after the extended shelf period will be substantially similar to its initial cure properties, for example, tack-free time (TFT), shown by the RTV composition upon being freshly mixed and immediately exposed to atmospheric moisture.

With respect to the silane scavenger of Formulas (1), (2), (6), and (7) in determining what levels to use in the practice of the instant invention, the total hydroxy-functionality of RTV compositions can be estimated. The total hydroxy functionality of the polymer can be determined by infrared analysis. In order to insure that an effective or stabilizing amount of scavenger is used to maintain the stability of the composition over an extended shelf period of six months or more at ambient temperature while in a sealed container, there can be used an additional amount of scavenger over that amount required to endstop the polymer. This excess of scavenger can be up to about 3% by weight, based on the weight of the polymer. The aforementioned 3% of savenger by weight exceeds that amount required to substantially eliminate available hydroxy functionality in the polymer as a result of reaction between OH functionality and X radicals. In compositions which also contain filler and other additives, the additional amount of scavenger of Formulas (1), (2) or (6), (7) which is required is estimated by running a 48-hour stability check at 100° C. to determine whether the tack-free time remains substantially unchanged as compared to the tack-free time of the composition before aging, measured under substantially the same conditions. The latter procedure is a more imperical method of determining the amount of scavenger necessary to scavenge the unbonded hydroxy groups in the manufacture of a particular composition and is given above as a guide in the manufacture of such compositions. The foregoing compounds of Formula (1), (2), (6) and (7) can be produced by methods known in the art. Thus, in such a procedure the appropriate chlorosilane is taken and dissolved in any of the inert organic solvents such as, for instance, hydrocarbon solvents such as cyclohexane, cycloheptane, etc.; and aromatic solvents such as xylene, toluene, etc. To this solution there is added the appropriate amine and the composition is heated at anywhere from room temperature to the reflux temperature of the solvent which can be up to 110° to 120° C. or more. A necessary aspect of the invention is there should be used a slight excess of the amine over the amount of the chlorosilane or siloxane. Thus, preferably there is utilized from 5 to 20% excess of the amine over the stoichiometric amount needed to react with the chlorosilane or siloxane. Stoichiometrically there is needed two moles of the amine per mole of chlorine to be replaced in the chlorosilane or siloxane. Twice the amount of amine is needed so that the amine halogen salt can be formed and precipitate out of solution, so that it can be removed. Further, by using a slight excess of 5 to 20% of amine as indicated above under preferred conditions, it is possible to obtain the maximum yield of desired product and minimize the formation of by-products. Such a reaction usually takes place in the foregoing temperature range in a period of time varying anywhere from ¼ hour to 5 hours or more, preferably taking place in a period of time occuring from ½ hour to 2 hours. Preferably, the reaction takes place under pressure; especially when the amine is a gas, thus increasing the rate of reaction. The pressure that can be utilized can be anywhere from 1 to 10 pounds above absolute. Excessive pressure is not necessary. After the reaction has proceeded to completion, the amine halogen salt that is formed is filtered out and the solvent is stripped off to give the desired product. The desired product is kept in an anhydrous manner since it will hydrolyze very easily with moisture. The resulting product of Formulas (1), (2) or coming within the scope of (6) and (7) can then be utilized to prepare the compositions of the instant case.

The examples below are given for the purpose of illistrating the present invention. They are not given for any purpose for setting limits and boundaries to the instant invention.

EXAMPLE I

Synthesis of Methyldimethoxychlorosilane, 3

To a 3,000 ml, round bottom, three-necked flask was attached a mechanical stirrer, a thermometer, a dropping funnel equipped for adding methanol below the surface of the liquid, and a reflux condenser. To the flask was added 1423 parts (9.5 moles) of methyltrichlorosilane while to the dropping funnel was added 609 parts (19.0 moles) of anhydrous methanol. While stirring, the methanol was added at a rate of 1.7 ml/min and samples were withdrawn periodically for analysis by gas chromatography. At the end of methanol addition, the reaction mixture was heated to 50° C. and then cooled and bottled. During the addition of methanol, the reaction temperature was maintained between 21°–29° C. The final product yield was 1132.5 parts (88.3%). Analysis by titration for % Cl was 21.5 (Theory=25.3).

Synthesis of Methyldimethoxy-N-methylaminosilane, 2

To a 3,000 mL, flask equipped with a mechanical stirrer, a thermometer, a dropping funnel, a reflux condenser and a tube dipping below the liquid layer for feeding in methylamine, was added 1500 parts of hexane to which methylamine was bubbled through at a rapid rate. A sample of the hexane when analyzed by gas chromatography showed less than 500 ppm methylamine after bubbling in the gas for 30 minutes. Titration for % amine revealed 0.82% amine in the hexane solution. To the dropping funnel was added 572 parts (4.07)moles) of methyldimethoxychlorosilane which was added to the hexane while bubbling in methylamine. The rate of addition of methylamine was controlled so that its concentration was always in excess of the chlorosilane in the solution. This was monitored by detecting excess methylamine at the condenser exit. At the end of the addition of the chlorosilane, the liquid was separated from the solid by filtration and the solid was washed with fresh hexane. The filtrate obtained was distilled through a 75 cm, glass helices packed column with a 2:1 reflux ratio. A total of 1625 parts of hexane was recovered from the distillation. The residue remaining was collected and weighed. The yield of product was 467 parts (85%). Analysis by gas chromatography showed 79% methyldimethoxy-N-methylaminosilane, 15% methyltrimethoxysilane and no detectable dimer. Titration of the product for amine content showed 18.6% MeNH (Theory=22.1%).

A sample of crude methyldimethoxy-N-methylaminosilane was distilled to get pure material (b.p. 122°–123° C.) so that the pure endcapping/cross-linking agent could be effectively compared with the crude material. Both of these materials were reacted with silanol-stopped polydimethylsiloxane.

Additionally, the bis compound was isolated as a mixture. It was 68% pure.

EXAMPLE II

Evaluation of Endcapping/Cross-linking Reaction of Pure, Distilled Methyldimethoxy-N-Methylaminosilane with Silanol Polymer Into a 1000 mL polymer flask was weighed 1000 parts of a silanol-endstopped polydimethylsiloxane (0.1274% Si-OH) which had a viscosity of 2,550 centipoises at 25° C. To this was added 40.5 parts of methyldimethoxy-N-methylaminosilane (92% pure) rapidly while stirring. Samples were withdrawn periodically from the reaction mixture and analyzed by titration for % amine and by near infrared spectroscopy for % silanol. Table I shows the results of these analyses and the data show the endcapping reaction to be very fast.

TABLE I

| Analysis of In-Process Samples from Endcapping Reaction | | | |
|---|---|---|---|
| Sample No. | Reaction Time | % RNH$_2$ | ppm Si—OH |
| 1 | 0 | — | 1274 |
| 2 | 7 min. | 0.91 | 143 |
| 3 | 1 hour | 0.88 | 80 |
| 4 | 2.5 hours | 0.68 | — |
| 5 | 17 hours | 0.14 | — |
| 6 | 20 hours | 0.11 | 22.4 |

The final product had a viscosity of 2,240 centipoises. When a sample of the endcapped polymer was mixed with dibutyltindilaurate and exposed to atmospheric moisture, it cured to an elastomer upon setting overnight. Material mixed with the tin catalyst and kept in a closed container away from moisture did not cure. Thus, the amine functions as a cure accelerator and no curing takes place in the absence of moisture.

EXAMPLE III

Evaluation of Endcapping/Cross-linking Reaction of Crude, Undistilled Methyldimethoxy-N-Methylaminosilane with Silanol Polymer To a polymer reaction flask was added 1000 parts of a silanol-stopped, polydimethylsiloxane containing 0.1274% silanol which had a viscosity of 2,550 centipoises. To this was added 36.1 parts (0.27 mole) of methyldimethoxy-N-methylaminosilane. An initial sample was taken after stirring at room temperature for one hour. It showed 0.67% amine as $CH_3NH_2$ and 33 ppm silanol. The reaction mixture was further treated in order to reduce the amine content. It was heated at 70° C. and 60 mm for 30 min. (% $CH_3NH_2$=0.44), followed by purging overnight at room temperature with nitrogen (% $CH_3NH_2$=0.073) and then heated at 75° C./25 mm for 2 hours (% $CH_3NH_2$=0.046). The endcapped polymer had virtually no amine odor.

EXAMPLE IV

Evaluation of Endcapping/Cross-linking Reaction of 1,3-Di-Methyl-1,1,3,3-Tetramethoxy-N-Methyldisilazane, 5, with Silanol Polymer To a 1000 mL polymer reaction flask was added 1000 parts of a silanol-stopped polydimethylsiloxane (0.1274% silanol) and 35.8 parts of a 68:3 mixture of the silazane and methyldimethoxy-N-methylaminosilane. The reaction misture was stirred and then sampled after one hour. Analysis for % silanol by near infrared spectroscopy and % amine by titration showed values of 852 ppm and 0.51% respectively. These results show the silazane derivative, to be significantly slower reacting with silanol than the aminosilane. The reaction mixture was purged overnight with nitrogen whereupon it showed 407 ppm silanol and 0.44% amine. Upon continued purging, a sample after 48 hours showed 285 ppm silanol and 0.42% amine. The final viscosity was 2.280 centipoises. The yield was 1,002 parts.

A portion of this material was mixed with dibutyltindilaurate and placed in a bottle free of contact with atmospheric moisture. When a part of this mixture was exposed to atmospheric moisture, it cured overnight to an elastomer. However, the material in the bottle increased in viscosity which indicated that coupling was occurring because of the presence of unreacted silanol due to the incomplete endcapping reaction.

EXAMPLE V

Synthesis of 1,3 bis(N-methylamino)-1,1,3,3-tetramethyldisiloxane

This is a fictitious example.

To a 3,000 mL flask there is added 1,500 parts of hexane through which methylamine is bubbled at a rapid rate. From a dropping funnel is added 406 parts (2.0 moles) of 1,3 dichloro-1,1,3,3 tetramethyldisiloxane. The rate of addition of methylamine is controlled so that its concentration is always in excess of the chlorosilane in the solution. At the end of the addition, the solids are separated by filtration and distillation of the liquid phase gives 350 parts of a liquid identified as 1,3-bis(N-methylamino)-1,1,3,3-tetramethyl-disiloxane.

Evaluation of 1,3-bis(N-methylamino)-1,1,3,3-tetramethyldisiloxane as a scavenging compound for RTV compositions.

When a mixture of a dimethoxy endstopped polydimethylsiloxane is mixed with the above mentioned compound, methyltrimethoxysilane and a tin soap, curing of the material to an elastomer occurred when exposed to atmospheric moisture. When moisture was excluded, no curing occurred even when stored at 100° C. for 48 hours. After storage for 48 hours at 100° C. the material is then exposed to atmospheric moisture whereupon it cures to an elastomer. When the same composition is mixed except that the title scavenging compound is replaced by d-n-hexylamine, curing of the compound to an elastomer occurs. However, after storage of the same composition at 100° C. for 48 hours, the material did not cure upon exposure to atmospheric moisture. Thus, this demonstrates the effectiveness of 1,3 bis(N-methylamino) 1,1,3,3 tetramethyldisiloxane to function as a scavenging compound.

EXAMPLE VI

Synthesis of methyldimethoxy-N,N-diethylaminosilane

This is a fictitious example.

To a 3,000 mL flask is added 1,500 parts of hexane to which 161 parts of diethylamine is added (2.2 moles). To this solution is added dropwise 240 parts (2.0 moles) of methyldimethoxychlorosilane. At the end of the addition, the reaction mixture is filtered and the filtrate is distilled to remove hexane. The residue obtained, 320 parts, is the desired compound, methyldimethoxy N,N-diethylaminosilane. The yield is 90%.

Evaluation of methyldimethoxy N,N-diethylaminosilane as cross-linker/scavenging compound for RTV compositions To a silanol end-stopped polydimethylsiloxane is added an appropriate amount of the above compound to react with all of the silanol and replace the end of the polymer chain with methyldimethoxysilyl groups. A slight excess of the compound is used so that it can function as a scavenger in addition to being used to endcap the silanol polymer. The resulting mixture is mixed with the appropriate amount of methyltrimethoxysilane and a tin soap. A sample of this mixture cures to an elastomer when exposed to atmospheric moisture. When moisture is excluded the sample did not cure even when stored for 48 hours at 100° C. After 48 hours at 100° C., the compound cured to an elastomer when exposed to atmospheric moisture. This demonstrates the effectiveness of methyldimethoxy N,N-diethylaminosilane to function as a cross-linker/scavenger in RTV systems.

I claim:

1. A shelf-stable, fast-curing one-component RTV silicone rubber composition comprising,
   (A) an organopolysiloxane polymer having a viscosity varying in the range of 100 to 1,000,000 centipoise at 25° C. where the organo groups are monovalent hydrocarbon radicals, and wherein in said polymer, the terminal silicon atoms in the polymer chain have bonded to them at least one alkoxy group;
   (B) an effective amount of a condensation catalyst; and (C) an effective amount of a scavenging compound of the formula,

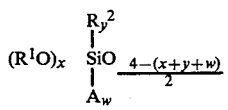

where $R^1$ and $R^2$ are individually selected from $C_{1-13}$ monovalent hydrocarbon radicals and A is a radical selected from the group consisting of simple amine radicals of the formula,

where $R^{10}$ and $R^{11}$ are individually selected from hydrogen $C_{1-8}$ monovalent hydrocarbon radicals, and multi-amine functional radicals of the formula,

where $R^3$ is selected from the group consisting of hydrogen, $C_{1-8}$ monovalent hydrocarbon radicals, and a radical of the formula

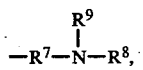

wherein $R^8$ and $R^9$ are individually selected from the group consisting of hydrogen and $C_{1-8}$ monovalent hydrocarbon radicals and $R^7$ is a $C_{2-8}$ divalent hydrocarbon radical; $R^4$ is a $C_{2-8}$ divalent hydrocarbon radical, $R^5$ and $R^6$ are individually selected from the group consisting of hydrogen and $C_{1-8}$ monovalent hydrocarbon radicals; x varies in the range of 0.00 to 2.50; y varies in the range of 0.00 to 2.50; and w varies in the range of 0.05 to 1.5; and the sum of x+y+w varies in the range of 2.10 to 3.00.

2. The composition of claim 1 wherein the condensation catalyst is a tin condensation catalyst.

3. The composition of claim 2 further comprising having an effective amount of cross-linking silane of the formula,

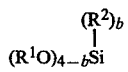

where $R^1$ and $R^2$ are individually selected from $C_{1-13}$ monovalent hydrocarbon radicals and b is a whole number equal to 0 or 1.

4. The composition of claim 3 further comprising an effective amount of a cure accelerator selected from the group consisting of substituted guanidines, amines and mixtures thereof.

5. The composition of claim 4 further comprising a polyalkoxy-terminated organopolysiloxane polymer of the formula,

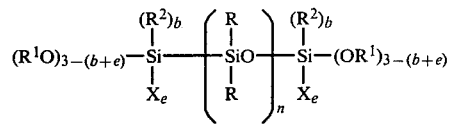

where R, $R^1$, $R^2$ are each individually selected from $C_{1-13}$ monovalent hydrocarbon radicals; b is a whole number equal to 0 or 1; e is a whole number which equals to 0 or 1, inclusive; n is an integer having a value of from about 50 to 2,500, inclusive; and X is a hydrolyzable leaving group selected from the class consisting of amido, cyclic amido, silazanyl, carbamato, enoxy, imidato, isocyanato, oximato, thioisocyanato, ureido radicals, and radicals selected from the class consisting of simple amine radicals of the formula,

where $R^{10}$, $R^{11}$ are individually selected from hydrogen, $C_{1-8}$ monovalent hydrocarbon radicals, and multi-amine functional radicals of the formula,

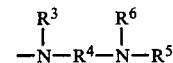

where $R^3$ is selected from the class consisting of hydrogen, $C_{1-8}$ monovalent hydrocarbon radicals, and a radical of the formula,

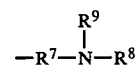

wherein $R^8$, $R^9$ are individually selected from the class consisting of hydrogen and $C_{1-8}$ monovalent hydrocarbon radicals and $R^7$ is a $C_{2-8}$ divalent hydrocarbon radical; $R^5$ and $R^6$ are individually selected from the class consisting of hydrogen and $C_{1-8}$ monovalent hydrocarbon radicals, $R^4$ is a $C_{2-8}$ divalent hydrocarbon radical.

6. The composition of claim 5 wherein the cross-linking silane is methyltrimethoxysilane, the condensation catalyst is selected from the class consisting of dibutyltindiacetate and dibutyltindilaurate, and the curing accelerator is selected from the class consisting of di-n-hexylamine and di-n-butylamine.

7. The composition of claim 5 wherein the condensation catalyst is selected from the class consisting of dibutyltindiacetate and dibutyltindilaurate and the cure accelerator is selected from the class consisting of di-n-hexylamine and di-n-butylamine.

8. The composition of claim 5 wherein R, $R^1$ and $R^2$ are methyl and the tin condensation catalyst is selected from the class consisting of dibutyltindiacetate and dibutyltindilaurate.

9. A shelf-stable, fast-curing one-component RTV silicone rubber composition, comprising, (A) a silanol-terminated diorganopolysiloxane polymer having a viscosity in the range of 100 to 1,000,000 centipoise at 25° C. where the organo groups are monovalent hydrocarbon radicals;

(B) an integrated cross-linker, scavenger compound of the formula,

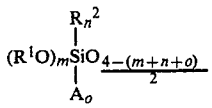

where $R^1$ and $R^2$ are individually selected from $C_{1-13}$ monovalent hydrocarbon radicals and A is a radical selected from the group consisting of simple amine radicals of the formula,

where $R^{10}$ and $R^{11}$ are individually selected from hydrogen, $C_{1-8}$ monovalent hydrocarbon radicals, and multi-amine functional radicals of the formula,

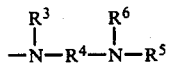

where $R^3$ is selected from the group consisting of hydrogen, $C_{1-8}$ monovalent hydrocarbon radicals, and a radical of the formula

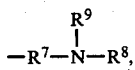

wherein $R^8$ and $R^9$ are individually selected from the group consisting of hydrogen and $C_{1-8}$ monovalent hydrocarbon radicals and $R^7$ is a $C_{2-8}$ divalent hydrocarbon radical, $R^4$ is a $C_{2-8}$ divalent hydrocarbon radical, $R^5$ and $R^6$ are individually selected from the group consisting of hydrogen and $C_{1-8}$ monovalent hydrocarbon radicals; m varies in the range of 0.15 to 2.50; n varies in the range of 0.1 to 1.9; an o varies in the range of 0.05 to 2.00; and the sum of m+n+o varies in the range of 2.10 to 3.00, which forms with the silanol-terminated polymer, an alkoxy terminated polymer; and (C) an effective amount of a condensation catalyst.

10. The composition of claim 9 wherein the silanol-terminated diorganopolysiloxane polymer has the formula,

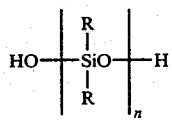

wherein each R is individually selected from $C_{1-13}$ monovalent hydrocarbon radicals and n is a whole number that varies from 50 to 2,500.

11. The composition of claim 9 wherein the alkoxy-terminated polymer that is formed has the formula,

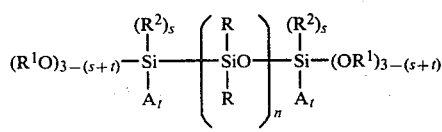

where R, $R^1$ and $R^2$ are individually selected from $C_{1-13}$ monovalent hydrocarbon radicals; s is a whole number equal to 0 or 1; n is an integer that varies from 50 to 2,500, inclusive; t is a whole number equal to 1 or 2, inclusive; and the sum of s+t is equal to 1 to 2; and A is as previously defined.

12. The composition of claim 9 wherein the condensation catalyst is a tin condensation catalyst.

13. The composition of claim 12 further comprising having an effective amount of a cross-linking silane of the formula,

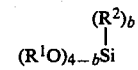

where $R^1$ and $R^2$ are individually selected from $C_{1-13}$ monovalent hydrocarbon radicals; and b is a whole number equal to 0 or 1.

14. The composition of claim 13 further comprising adding an effective amount of a cure accelerator selected from the group consisting of substituted guanidines, amines and mixtures thereof.

15. The composition of claim 14 further comprising having therein a polyalkoxy-terminated organopolysiloxane polymer of the formula,

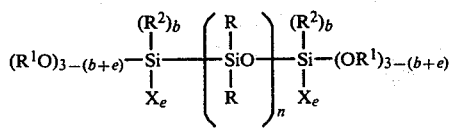

where R, $R^1$, $R^2$ are individually selected from $C_{1-13}$ monovalent hydrocarbon radicals; b+e are whole numbers equal to 0 or 1; e is a whole number which equals to 0 or 1, inclusive; and the sum of b+e is equal to 0 or 1, inclusive; n is an integer having a value of from about 50 to 2,500, inclusive; and X is a hydrolyzable leaving group selected from the class consisting of amido, cyclic aido, silazanyl, carbamato, enoxy, imidato, isocyanato, oximato, thioisocyanato, ureido radicals, and radicals selected from the class consisting of simple amine radicals of the formula,

where $R^{10}$, $R^{11}$ are individually selected from hydrogen, $C_{1-8}$ monovalent hydrocarbon radicals, and multi-amine functional radicals of the formula,

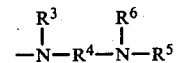

where $R^3$ is selected from the class consisting of hydrogen, $C_{1-8}$ monovalent hydrocarbon radicals, and a radical of the formula,

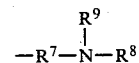

wherein $R^8$, $R^9$ are individually selected from the class consisting of hydrogen and $C_{1-8}$ monovalent hydrocarbon radicals and $R^7$ is a $C_{2-8}$ divalent hydrocarbon radical; $R^5$ and $R^6$ are individually selected from the class consisting of hydrogen and $C_{1-8}$ monovalent hydrocarbon radicals, $R^4$ is a $C_{2-8}$ divalent hydrocarbon radical.

16. The composition of claim 15 wherein the crosslinking silane is methyltrimethoxy silane, the condensation catalyst is selected from the class consisting of dibutyltindiacetate and dibutyltindilaurate and a curing accelerator selected from the class consisting of di-n-hexylamine and di-n-butylamine.

17. The composition of claim 15 wherein the condensation catalyst is selected from the class consisting of dibutyltindiacetate and dibutyltindilaurate and the cure accelerator is selected from the class consisting of di-n-hexylamine and di-n-butylamine.

18. The composition of claim 15 wherein R, $R^1$, and $R^2$ are methyl and the tin condensation catalyst is selected from the class consisting of dibutyltindiacetate and dibutyltindilaurate.

19. A process for producing a shelf-stable, fast-curing one-component RTV silicone rubber composition comprising, mixing anhydrously,
(A) an organopolysiloxane polymer having a viscosity varying in the range of 100 to 1,000,000 centipoise at 25° C. where the organo groups are monovalent hydrocarbon radicals, and wherein the terminal silicon atoms of said polymer have bonded to them at least one alkoxy group;
(B) an effective amount of a condensation catalyst; and
(C) an effective amount of a scavenging compound of the formula

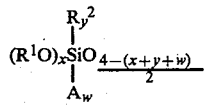

where $R^1$ and $R^2$ are individually selected from $C_{1-13}$ monovalent hydrocarbon radicals and A is a radical selected from the group consisting of simple amine radicals of the formula,

where $R^{10}$ and $R^{11}$ are individually selected from hydrogen, $C_{1-8}$ monovalent hydrocarbon radicals, and multi-amine functional radicals of the formula,

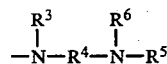

where $R^3$ is selected from the group consisting of hydrogen, $C_{1-8}$ monovalent hydrocarbon radicals, and a radical of the formula

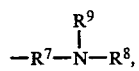

wherein $R^8$ and $R^9$ are individually selected from the group consisting of hydrogen and $C_{1-8}$ monovalent hydrocarbon radicals and $R^7$ is a $C_{2-8}$ divalent hydrocarbon radical, $R^4$ is a $C_{2-8}$ divalent hydrocarbon radical, $R^5$ and $R^6$ are individually selected from the group consisting of hydrogen and $C_{1-8}$ monovalent hydrocarbon radicals; x varies in the range of 0.00 to 2.50; y varies in the range of 0.00 to 2.50; and w varies in the range of 0.05 to 1.5; and the sum of x+y+w varies in the range of 2.10 to 3.00.

20. A process for forming a shelf-stable, fast-curing one-component RTV silicone rubber composition, comprising, mixing in a substantially anhydrous manner,
(A) a silanol-terminated diorganopolysiloxane polymer having a viscosity in the range of 100 to 1,000,000 centipoise at 25° C. where the organo groups are monovalent hydrocarbon radicals;
(B) an effective amount of a scavenging compound of the formula,

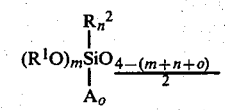

where $R^1$ and $R^2$ are individually selected from $C_{1-13}$ monovalent hydrocarbon radicals and A is a radical selected from the group consisting of a simple amine radical of the formula,

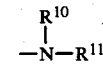

where $R^{10}$ and $R^{11}$ are each individually selected from hydrogen, $C_{1-8}$ monovalent hydrocarbon radicals, and multi-amine functional radicals of the formula,

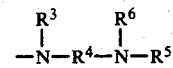

where $R^3$ is selected from the group consisting of hydrogen, $C_{1-8}$ monovalent hydrocarbon radicals, and a radical of the formula

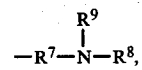

wherein $R^8$ and $R^9$ are individually selected from the group consisting of hydrogen and $C_{1-8}$ monovalent hydrocarbon radicals and $R^7$ is a $C_{2-8}$ divalent hydrocarbon radical, $R^4$ is a $C_{2-8}$ divalent hydrocarbon radical, $R^5$ and $R^6$ are individually selected from the group consisting of hydrogen and $C_{1-8}$ monovalent hydrocarbon radicals; m varies in the range of 0.15 to 2.50; n varies in the range of 0.1 to 1.9; and o varies in the range of 0.05 to 2.00; and the sum of m+n+o varies in the range of 2.10 to 3.00.
(C) an effective amount of a condensation catalyst.

21. The process of claim 20 wherein the silanol terminated diorganopolysiloxane polymer has the formula,

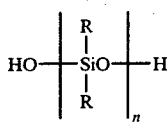

wherein each R is individually selected from $C_{1-13}$ monovalent hydrocarbon radicals and n is a whole number that varies from 50 to 2,500.

22. The process of claim 20 wherein the alkoxy-terminated polymer that is formed has the formula,

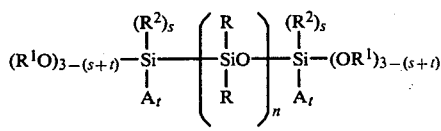

where R, $R^1$, and $R^2$ are individually selected from $C_{1-13}$ monovalent hydrocarbon radicals; s is a whole number equal to 0 or 1; t is a whole number equal to 1 or 2, inclusive; and the sum of s+t is equal to 1 to 2; and A is as previously defined.

23. The process of claim 20 wherein the condensation catalyst is a tin condensation catalyst.

24. The process of claim 23 further comprising adding an effective amount of a cross-linking silane of the formula,

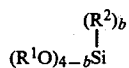

where $R^1$ and $R^2$ are each individually selected from $C_{1-13}$ monovalent hydrocarbon radicals and b is a whole number that is equal to 0 or 1.

25. The process of claim 24 further comprising an effective amount of a cure accelerator selected from the group consisting of substituted guanidines, amines and mixtures thereof.

26. The process of claim 25 further comprising polyalkoxy-terminated organopolysiloxane polymer of the formula,

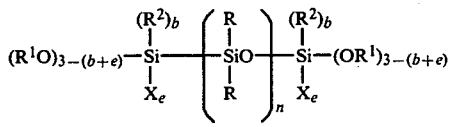

where R, $R^1$, $R^2$ are individually selected from $C_{1-13}$ monovalent hydrocarbon radicals; b is a whole number equal to 0 or 1; e is a whole number which equals 0 or 1, inclusive; the sum of b+e is equal to 0 or 1, inclusive; n is an integer having a value of from about 50 to 2,500, inclusive; and X is a radical selected from the class consisting of amido, cyclic amido, silazanyl, carbamato, enoxy, imidato, isocyanato, oximato, thioisocyanato, ureido radicals, and simple amine radicals of the formula,

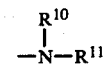

where $R^{10}$, $R^{11}$ are individually selected from hydrogen, $C_{1-8}$ monovalent hydrocarbon radicals, and multiamine functional radicals of the formula,

where $R^3$ is selected from the class consisting of hydrogen, $C_{1-8}$ monovalent hydrocarbon radicals, and a radical of the formula,

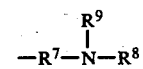

wherein $R^8$, $R^9$ are individually selected from the class consisting of hydrogen and $C_{1-8}$ monovalent hydrocarbon radicals and $R^7$ is a $C_{2-8}$ divalent hydrocarbon radical; $R^5$ and $R^6$ are individually selected from the class consisting of hydrogen and $C_{1-8}$ monovalent hydrocarbon radicals, $R^4$ is a $C_{2-8}$ divalent hydrocarbon radical.

27. The process of claim 26 wherein the cross-linking silane is methyltrimethoxysilane, the condensation catalyst is selected from the class consisting of dibutyltindiacetate and dibutyltindilaurate, and the curing accelerator is selected from the class consisting of di-n-hexylamine and di-n-butylamine.

28. The process of claim 26, wherein the condensation catalyst is selected from the class consisting of dibutyltindiacetate and dibutyltindilaurate and the accelerator is selected from the class consisting of di-n-hexylamine and di-n-butylamine.

29. The process of claim 26 wherein R, $R^1$, and $R^2$ are methyl and the tin condensation catalyst is selected from the class consisting of dibutyltindiacetate and dibutyltindilaurate.

* * * * *